(12) United States Patent
Okamura et al.

(10) Patent No.: US 10,494,985 B2
(45) Date of Patent: Dec. 3, 2019

(54) ENGINE WARM-UP APPARATUS FOR VEHICLE

(71) Applicant: DENSO CORPORATION, Kariya, Aichi-pref. (JP)

(72) Inventors: Toru Okamura, Kariya (JP); Kenichi Nara, Kariya (JP); Kuniyoshi Tanioka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 214 days.

(21) Appl. No.: 15/651,268

(22) Filed: Jul. 17, 2017

(65) Prior Publication Data
US 2018/0023453 A1 Jan. 25, 2018

(30) Foreign Application Priority Data

Jul. 20, 2016 (JP) ................................. 2016-142598

(51) Int. Cl.
*F01P 7/16* (2006.01)
*F01P 11/20* (2006.01)
(Continued)

(52) U.S. Cl.
CPC .............. *F01P 7/165* (2013.01); *F01P 7/167* (2013.01); *F01P 11/20* (2013.01);
(Continued)

(58) Field of Classification Search
CPC ................................................. F01P 2011/205
See application file for complete search history.

(56) References Cited

U.S. PATENT DOCUMENTS 5,407,130 A * 4/1995 Uyeki ................ B60H 1/00492
1/492
2002/0035972 A1* 3/2002 Suzuki ............... B60H 1/00492
1/492
(Continued)

FOREIGN PATENT DOCUMENTS

DE          19616586 A1 * 10/1997  .............. F01P 11/20
JP       H05202749 A      8/1993
(Continued)

OTHER PUBLICATIONS

Marx, DE 19616586, machine translation (Year: 1997).*

*Primary Examiner* — Hung Q Nguyen
*Assistant Examiner* — Mark L. Greene
(74) *Attorney, Agent, or Firm* — Harness, Dickey & Pierce, P.L.C

(57) ABSTRACT

A warm-up device is provided in a cooling-water circuit, through which cooling water is circulated so as to pass through an engine. The warm-up device has a heat accumulating passage, in which a heat accumulating device is provided, and an accumulating-device bypassing passage bypassing the heat accumulating device. A waste-heat collecting device is provided in the cooling-water circuit so that heat is collected from exhaust gas from the engine and such collected heat is accumulated in the heat accumulating device. The cooling water is circulated through the heat accumulating device during a start-up operation of the engine in order to heat the cooling water flowing into the engine so as to quickly warm up the engine.

13 Claims, 12 Drawing Sheets

(51) Int. Cl.
*G01K 13/02* (2006.01)
*G01M 15/04* (2006.01)

(52) U.S. Cl.
CPC ..... *F01P 2011/205* (2013.01); *F01P 2025/50* (2013.01); *F01P 2025/52* (2013.01); *F01P 2060/18* (2013.01); *G01K 13/02* (2013.01); *G01K 2013/026* (2013.01); *G01M 15/048* (2013.01)

(56) References Cited

U.S. PATENT DOCUMENTS

| | | |
|---|---|---|
| 2012/0137992 A1 | 6/2012 | Kinomuka et al. |
| 2012/0241120 A1* | 9/2012 | Hagel ................ B60H 1/00492 |
| | | 1/492 |
| 2017/0276436 A1 | 9/2017 | Kasamatsu et al. |

FOREIGN PATENT DOCUMENTS

| | | |
|---|---|---|
| JP | H06-173679 A | 6/1994 |
| JP | 2001-280134 A | 10/2001 |
| JP | 2011208865 A | 10/2011 |
| JP | 2011-218919 A | 11/2011 |
| JP | 2015-094260 A | 5/2015 |
| JP | 2016069554 A | 5/2016 |
| WO | WO-2011/042942 A1 | 4/2011 |

* cited by examiner

FIG. 2

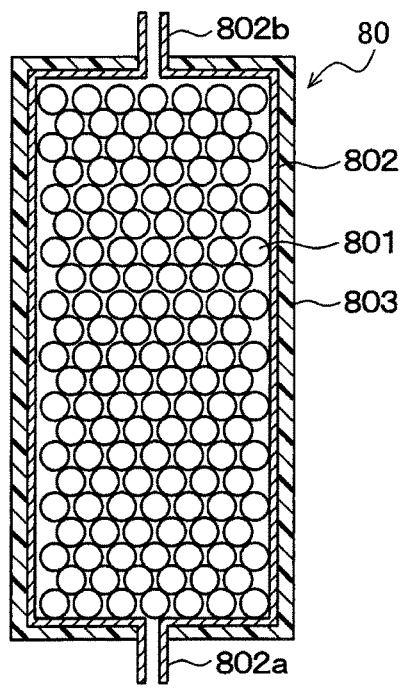

FIG. 3

| | OPERATING MODE | WARM-UP MODE | FIRST COOLING MODE | HEAT ACCUMULATING MODE | SECOND COOLING MODE |
|---|---|---|---|---|---|
| ENGINE OPERATING CONDITION | WARM-UP | NOT YET COMPLETED | COMPLETED | COMPLETED | COMPLETED |
| | ENGINE OPERATION | COLD START | IN OPERATION | STOPPED | COOLING OPERATION |
| CIRCULATION OF COOLING WATER THROUGH ENGINE | CIRCULATION THROUGH ENGINE | YES | YES | YES | YES |
| | FLOW AMOUNT | SMALL | LARGE | SMALL | LARGE |
| CIRCULATION OF COOLING WATER THROUGH HEAT ACCUMULATING DEVICE | | YES | STOPPED | YES | STOPPED |
| OPERATION OF THERMOSTAT | | CLOSED | CLOSED | CLOSED | OPENED |

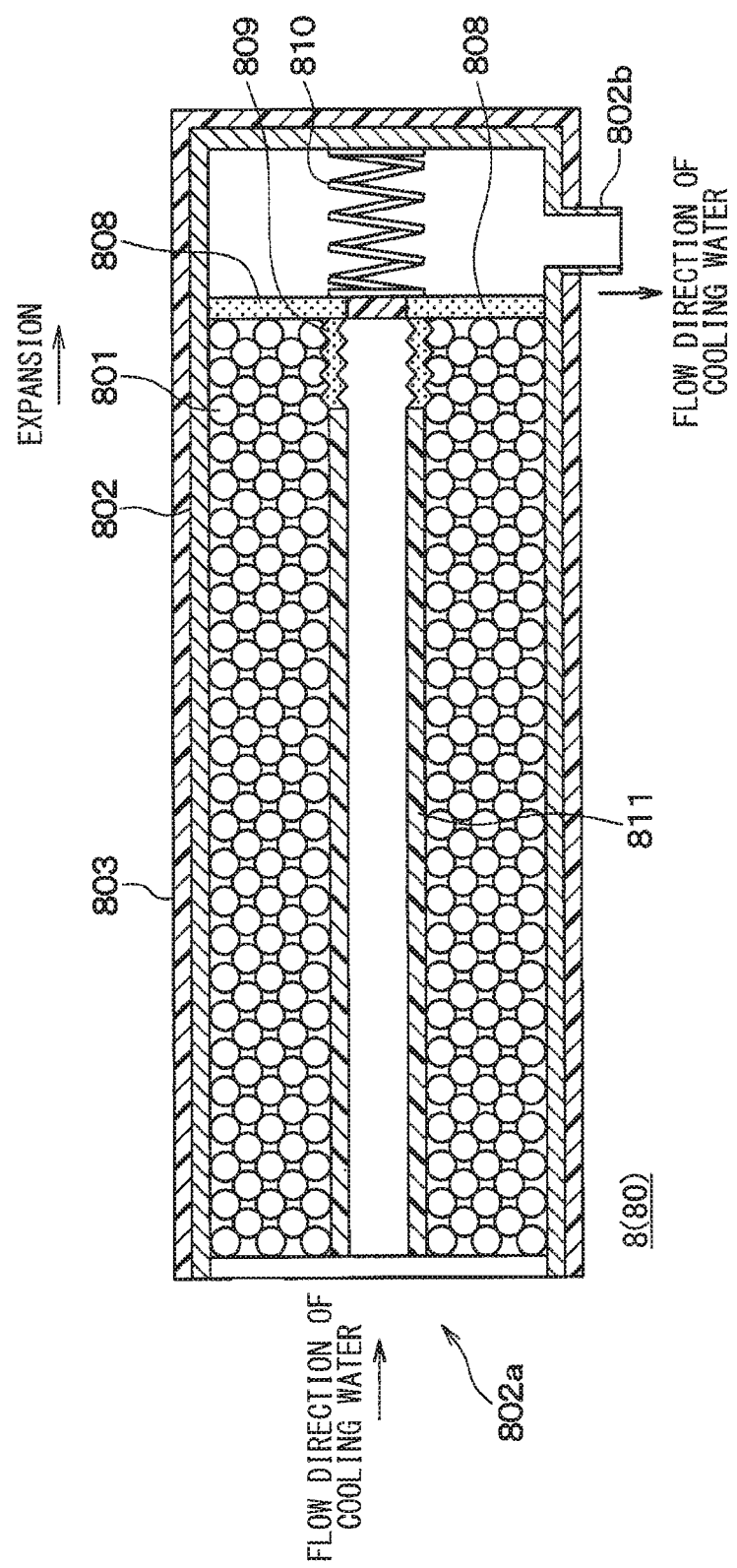

ENGINE WARM-UP APPARATUS FOR VEHICLE

CROSS REFERENCE TO RELATED APPLICATION

This application is based on Japanese Patent Application No. 2016-142598 filed on Jul. 20, 2016, the disclosure of which is incorporated herein by reference.

FIELD OF TECHNOLOGY

The present disclosure relates to an engine warm-up apparatus for an automotive vehicle.

BACKGROUND

In recent years, a spotlight has been casted on warming-up technology for quickly warming-up an internal, combustion engine of an automotive vehicle when starting an operation of the engine, in order not only to improve fuel consumption ratio but also to provide a comfortable air conditioning environment for the automotive vehicle.

The technology of this kind is known in the art, for example, as disclosed in International Patent Publication. No. WO 2011/042942. According to the prior art, a cooling system for an automotive vehicle has a first cooling-water circuit and a second cooling-water circuit. Cooling water is circulated in the first cooling-water circuit, wherein the cooling water passes through an inside of an internal combustion engine of the automotive vehicle. On the other hand, the cooling water is circulated in the second cooling-water circuit without passing through the engine.

According to the above prior art, a valve device is provided in order not only to reduce a flow amount of the cooling water circulating in the first cooling-water circuit when the valve device is closed but also to mix the cooling water of the first: cooling-water circuit with the cooling water of the second cooling-water circuit when the valve device is opened. The valve device is so controlled that an opening degree of a valve member thereof becomes smaller when temperature of the cooling water in the first cooling-water circuit is lower than a predetermined threshold value, which is used for determining a half warm-up condition of the engine. A quick warm-up process for the engine is thus carried out by making the opening degree of the valve member smaller and thereby reducing a flow amount of the cooling water circulating in the first cooling-water circuit.

In the cooling system of the above prior art, since the cooling water is heated by heat generated by the engine itself, a relatively long time is necessary until the temperature of the cooling water is increased since the engine operation is started. Therefore, it is a problem that it is not possible to sufficiently obtain an effect of quickly warming-up the engine.

SUMMARY OF THE DISCLOSURE

The present disclosure is made in view of the above problem. It is an object of the present disclosure to provide an engine warm-up apparatus for an automotive vehicle, which is capable of more effectively and quickly warming-up an internal combustion engine of the automotive vehicle.

According to one of features of the present disclosure, an engine warm-up apparatus for an automotive vehicle has a cooling-water circuit through which cooling water is circulated so as to cool an internal combustion engine (hereinafter, the engine) of the vehicle. The engine warm-up apparatus further has a warm-up device provided in the cooling-water circuit in such a way that the warm-up device works as a fluid resistance for a flow of the cooling water flowing into the engine. The warm-up device has a heat accumulating device for accumulating waste heat of the engine by circulation of the cooling water through the heat accumulating device. The heat accumulating device heats the cooling water flowing into the engine when temperature of the cooling water is low, for example, in a cold start-up operation of the engine.

According to the above feature, it is possible to quickly heat the cooling water and to control a flow amount of the cooling water flowing into the engine at a smaller value, when the cooling water is circulated through the heat accumulating device and the engine during the cold start-up operation of the engine. Accordingly, it is possible to more effectively realize a quick warm up operation of the engine, when compared with a case in which the cooling water is directly heated with heat generated by the engine itself.

BRIEF DESCRIPTION OF THE DRAWINGS

The above and other objects, features and advantages of the present disclosure will become more apparent from the following detailed description made with reference to the accompanying drawings. In the drawings:

FIG. 2 is a schematic cross sectional view showing a heat accumulating device of the engine warm-up apparatus for the automotive vehicle according to the first embodiment;

FIG. 3 is a table showing operating modes of the engine warm-up apparatus for the automotive vehicle;

FIG. 14 is a schematic cross sectional view showing an operating condition of the heat accumulating device of the engine warm-up apparatus for the automotive vehicle according to the fifth embodiment.

DETAILED DESCRIPTION OF THE EMBODIMENTS

Figure 1:
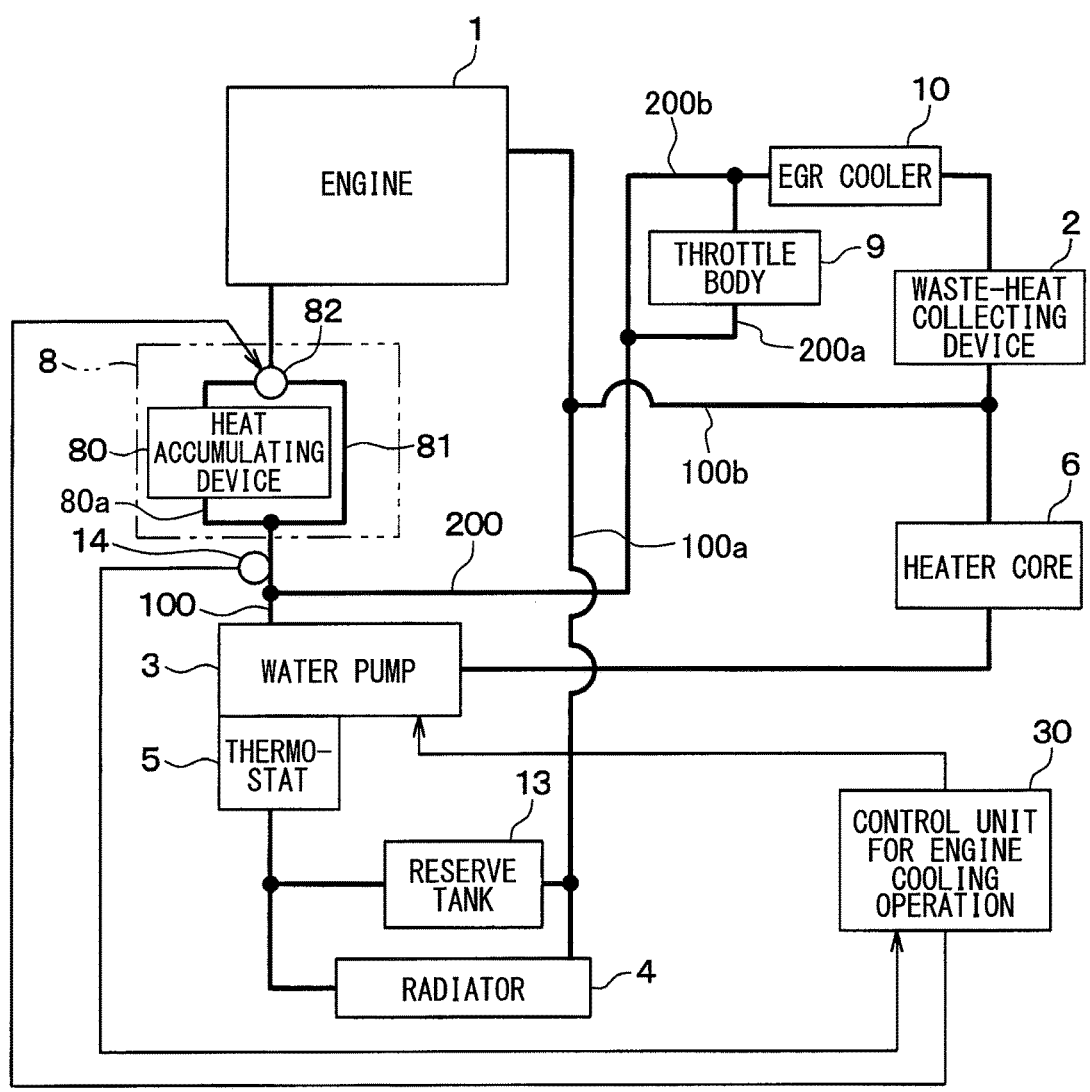
FIG. 1 is a block diagram showing a structure of a cooling-water circuit of an engine warm-up apparatus for an automotive vehicle according to a first embodiment of the present disclosure.

The present disclosure will be explained hereinafter by way of multiple embodiments and/or modifications with reference to the drawings. The same reference numerals are given to the same or similar parts or portions throughout the multiple embodiments and/or modifications in order to eliminate repeated explanation.

First Embodiment

An engine warm-up apparatus for an automotive vehicle according to a first embodiment of the present disclosure will be hereinafter explained with reference to FIGS. 1 to 8.

The automotive vehicle (hereinafter, the vehicle) of the present embodiment has an internal combustion engine 1 (hereinafter, the engine 1), which is used as a driving source for the vehicle. In addition, the vehicle has an idling-stop function, which temporarily stops an operation of the engine during a stop of vehicle running. FIG. 1 shows a structure of a cooling-water circuit, which is used in the engine warm-up apparatus (hereinafter, the warm-up apparatus) for the vehicle. Heavy lines in FIG. 1 indicate circulation of cooling water in the cooling-water circuit. The warm-up apparatus has a first cooling-water circuit 100, in which the cooling water is circulated and passes through an inside of the engine 1, and a second cooling-water circuit 200, in which the cooling water is circulated without passing through the engine 1 but passing through a waste-heat collecting device 2.

In each of the first and the second cooling-water circuits 100 and 200, the cooling water is pumped out by a common water pump 3, so that the cooling water is operatively circulated in each of the cooling-water circuits 100 and 200. The water pump 3 is composed of an electrical pump and capable of changing its discharge amount of the cooling water based on a command from an outside control unit In the present embodiment, the water pump 3 can continuously pump out the cooling water so as to circulate it in each of the first and the second cooling-water circuits 100 and 200, even during the operation of the engine 1 is temporarily stopped.

The first cooling-water circuit 100 is composed of a main passage 100*a* and a radiator bypassing passage 100*b*. The cooling water passes through the main passage 100*a* having the water pump 3, a warm-up device 8, the engine 1 and a radiator 4. The cooling water bypasses the radiator 4 when the cooling water passes through the radiator bypassing passage 100*b* bifurcated from the main passage 100*a*.

In the warm-up device 8 provided in the main passage 100*a* of the first cooling-water circuit 100, the main passage 100*a* is bifurcated into a heat accumulation passage 80*a* which passes through a heat accumulating device 80 (explained below), and an accumulating-device bypassing passage 81 which bypasses the heat accumulating device 80. Both of the heat accumulating passage 80*a* and the accumulating-device bypassing passage 81 join together at a passage switching valve 82. The cooling water is pumped out by the water pump 3 and flows into the engine 1 via the warm-up device 8. Then, the cooling water flows out from the engine 1 to the radiator 4 and then flows back to the water pump 3.

A temperature sensor 14 is provided at an outlet portion of the water pump 3 for the cooling water. The temperature sensor 14 detects temperature of the cooling water, which is pumped out from the water pump 3 and flows into the warm-up device 8. The temperature sensor 14 outputs a detection signal for the temperature of the cooling water to a control unit 30 for controlling an engine cooling operation.

As shown in FIG. 2, the heat accumulating device 80 is composed of heat accumulating material 801 of a capsule type, a heat accumulating housing 802 (hereinafter, the housing 802) of a cylindrical shape for accommodating the heat accumulating material 801, a heat insulating member 803 covering an outer periphery of the housing 802, and so on. The housing 802 and the heat insulating member 803 are collectively referred to as a heat insulating casing, which accommodates the heat accumulating material 801 and suppresses heat transfer between an inside and an outside of the heat insulating casing.

In the present embodiment, latent-heat accumulating material is used for the heat accumulating material 801, wherein latent heat generated by a phase change from a solid state to a liquid state is used. For example, materials belonging to "paraffin wax series", "higher alcohol series", "aliphatic acid series", "polyether series", "polysaccharide series" are used as the latent-heat accumulating material.

An inlet port 802*a* is formed at one of axial ends (one of longitudinal ends) of the housing 802, so that the cooling water flows into the housing 802. An outlet port 802*b* is formed at the other of the axial ends of the housing 802, so that the cooling water-flows out from the housing 802. The cooling water flows through gaps among the heat accumulating material 801, after it enters the housing 802 via the inlet port 802*a*, in which the heat accumulating material 801 is accommodated. Then, the cooling water flows out from the housing 802 via the outlet port 802*b*.

The heat accumulating device 80 is provided in the first cooling-water circuit 100 in such a way that the heat accumulating device 80 becomes a fluid resistance for a flow of the cooling water flowing into the engine 1, so that heat exchange is carried out between the cooling water and the heat accumulating material 801.

The passage switching valve 82 switches over the water passage for the cooling water pumped out from the water pump 3, that is, from the heat accumulating passage 80*a* in which the cooling water flows through the heat accumulating device 80 to the accumulating-device bypassing passage 81 in which the cooling water bypasses the heat accumulating device 80, or vice versa. The passage switching valve 82 is composed of, for example, a three-way valve operated by a command signal from an outside control unit, such as, the control unit 30.

The radiator 4 is a heat exchanger for radiating heat included in the cooling water of the first cooling-water circuit 100 to the atmosphere. A thermostat 5 is a valve of a temperature sensitive type, which is opened when the temperature of the cooling water passing through a heater core 6 (explained below) is higher than a predetermined value (for example, 105° C.) in order that the cooling water is circulated through the radiator 4. The thermostat 5 is closed when the temperature of the cooling water passing through the heater core 6 is lower than the predetermined value, so that the circulation of the cooling water through the radiator 4 is prohibited. As above, in the warm-up apparatus of the present embodiment, the radiator 4 is activated when the temperature of the cooling water flowing into the thermostat 5 becomes higher than the predetermined value so that the heat of the cooling water passing through the engine 1 is radiated to the atmosphere. A reserve tank 13 is provided at a position neighboring to the radiator 4 in order to store surplus amount of the cooling water.

In the first cooling-water circuit 100, the coolie g water flows through the radiator bypassing passage 100b so that the cooling water returns to the water pump 3 via the warm-up device 8, the engine 1 and the heater core 6.

The heater core 6 is a heat exchanger functioning as a heating device for the vehicle for heating air to be supplied into a passenger room of the vehicle after the air is heat-exchanged with the cooling water. In addition, the heater core 6 is a waste-heat utilizing device, which utilizes heat of exhaust gas collected by the waste-heat collecting device 2. The thermostat 5 continuously allows the circulation of the cooling water flowing through the radiator bypassing passage 100b.

In the second cooling-water circuit 200, the water passage is bifurcated into a first bifurcated passage 200a and a second bifurcated passage 200b, wherein a throttle body 9 is provided in the first bifurcated passage 200a and the second bifurcated passage 200b bypasses the throttle body 9. The first and the second bifurcated passages 200a and 200b join together at an upstream side of an EGR (Exhaust Gas Recirculation) cooler 10. The radiator bypassing passage 100b is connected to the second cooling-water circuit 200 at a point between the waste-heat collecting device 2 and the heater core 6.

The EGR cooler 10 provided in the second cooling-water circuit 200 is a heat exchanger for cooling the exhaust gas to be recirculated from an exhaust system of the engine 1 to an intake system of the engine 1. The waste-heat collecting device 2 is a heat exchanger for exchanging heat between the exhaust gas emitted from the engine 1 and the cooling water flowing through the second cooling-water circuit 200, so as to heat the cooling water by the heat collected from the exhaust gas.

In the warm-up apparatus for the vehicle of the present embodiment, a switching operation of the passage switching valve 82 as well as a flow amount of the cooling water to be pumped out from the water pump 3 is controlled by the control unit 30. The control unit 30 is composed of an electronic control unit having CPU for carrying out various kinds of calculation related to the engine cooling operation, ROM for memorizing programs and data for controlling the engine cooling operation, RAM for temporarily memorizing calculation results of the CPU and detection results of sensors, I/O for controlling signal inputs/outputs from/to outside devices, and so on.

The detection signal of the temperature sensor 14 for detecting the temperature of the cooling water flowing into the warm-up device 8 as well as an engine operating signal from an engine ECU (not shown) for indicating whether the engine 1 is in its operating condition or not is inputted to the control unit 30 for controlling the engine cooling operation.

The control unit 30 controls the passage switching valve 82 in such a way that the cooling water flows into the engine 1 through the heat accumulating device 80 during an engine start-up operation, when the temperature of the cooling water flowing into the warm-up device 8 is lower than a predetermined value (explained below more in detail), for example during the engine start-up operation. In addition, the control unit 30 controls the passage switching valve 82 in such a way that the cooling water flows into the engine 1 through the accumulating-device bypassing passage 81 when the temperature of the cooling water is higher than the predetermined value, for example, in an engine operation other than the engine start-up operation.

An operating mode of the warm-up apparatus for the vehicle will be explained with reference to FIG. 3. The operating mode of the warm-up apparatus has four modes depending on an operating condition of the engine 1. More exactly, as shown in FIG. 3, the operating mode includes a warm-up mode, a first cooling mode, a heat accumulating mode and a second cooling mode. The operating mode of the warm-up apparatus is changed depending on the operating condition of the engine 1.

When the operation of the engine 1 is started and the operating condition of the engine 1 is in a cold start-up condition, the warm-up apparatus is operated in the warm-up mode. The cold start-up condition corresponds to a condition in which temperature of the engine 1 is so low as to be almost equal to the ambient temperature. In the warm-up mode, a flow amount of the cooling water passing through the heat accumulating device 80 is made to be a smaller amount and thereby the flow amount of the cooling water passing through the engine 1 becomes correspondingly smaller, in order to quickly increase the temperature of the cooling water to be circulated through the engine 1. In the warm-up mode, the thermostat 5 is closed so that the circulation of the cooling water through the radiator 4 is prohibited.

When the operating condition of the engine 1 is in a condition that a warm-up operation is completed and the engine 1 is operating in a normal condition, the operating mode of the warm-up apparatus is changed to the first cooling mode. In the first cooling mode, the circulation of the cooling water through the heat accumulating device 80 is stopped and the flow amount of the cooling water to the engine 1 is increased in order to sufficiently cool down the engine 1. In other words, the cooling water is circulated through the accumulating-device bypassing passage 81, which bypasses the heat accumulating device 80, so that the flow amount of the cooling water to the engine 1 is increased. In the first cooling mode, the thermostat 5 is closed so that the circulation of the cooling water through the radiator 4 is still prohibited.

When the operating condition of the engine 1 is in a condition that the warm-up operation is completed but the operation of the engine 1 is temporarily stopped, the operating mode of the warm-up apparatus is changed to the heat accumulating mode. In the heat accumulating mode, the cooling water is circulated through the heat accumulating device 80 in order to heat the heat accumulating device 80 and the flow amount of the cooling water to the engine 1 is made smaller. In the heat accumulating mode, the thermostat 5 is still closed so that the circulation of the cooling water through the radiator 4 is still prohibited.

When the operating condition of the engine 1 is in a condition that it is necessary to cool down the engine 1, the operating mode of the warm-up apparatus is changed to the second cooling mode. In the second cooling mode, the circulation of the cooling water through the heat accumulating device 80 is prohibited and the flow amount of the cooling water to the engine 1 is increased in order to effectively cool down the engine 1 with a maximum cooling performance. In other words, the cooling water is circulated through the accumulating-device bypassing passage 81, which bypasses the heat accumulating device 80, so that the flow amount of the cooling water to the engine 1 is increased. In the second cooling mode, the thermostat 5 is opened so that the circulation of the cooling water through the radiator 4 is carried out.

Figure 4:
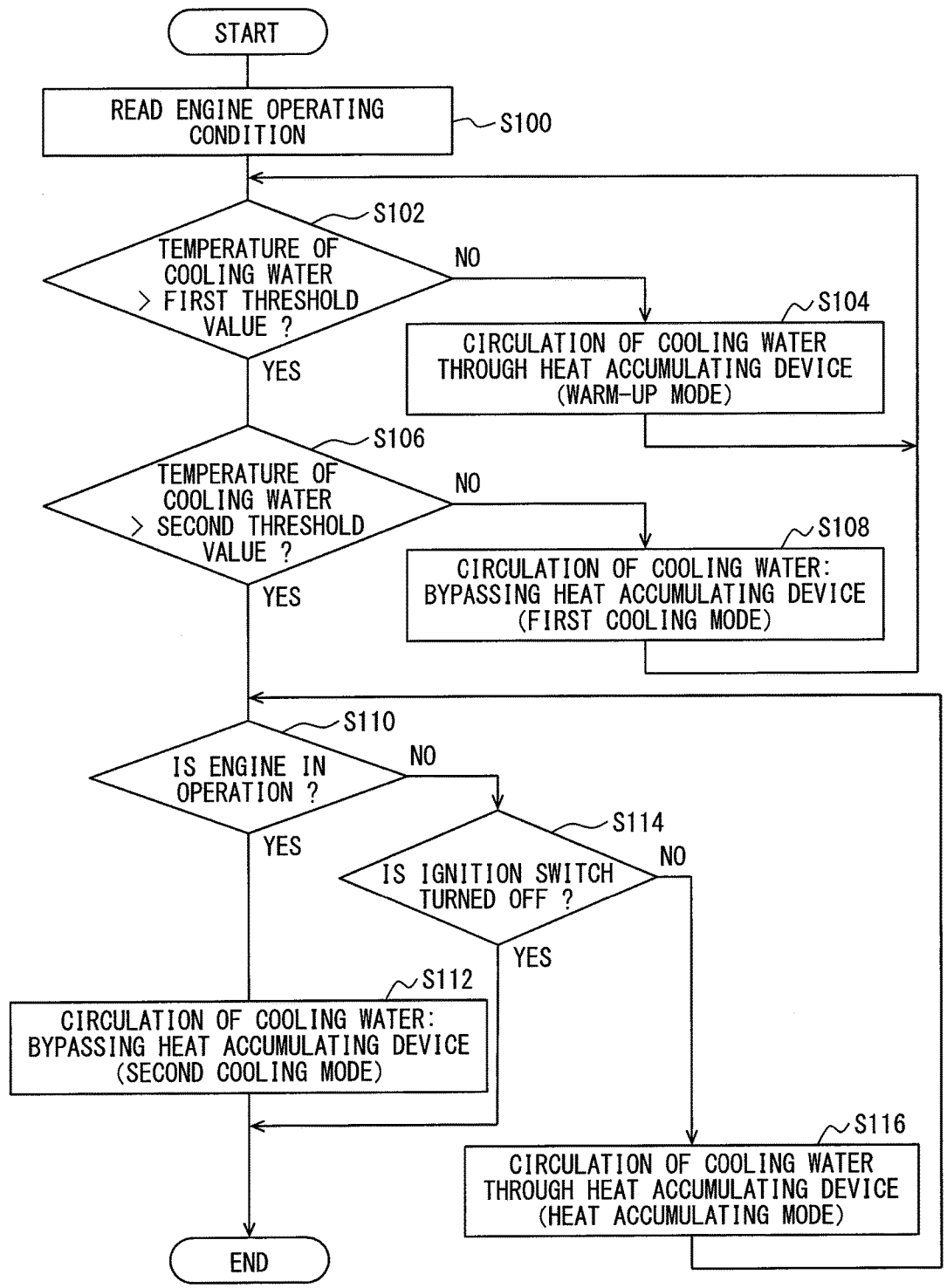
FIG. 4 is a flow chart showing a process carried out by a control unit for cooling an internal combustion engine.
Figure 5:
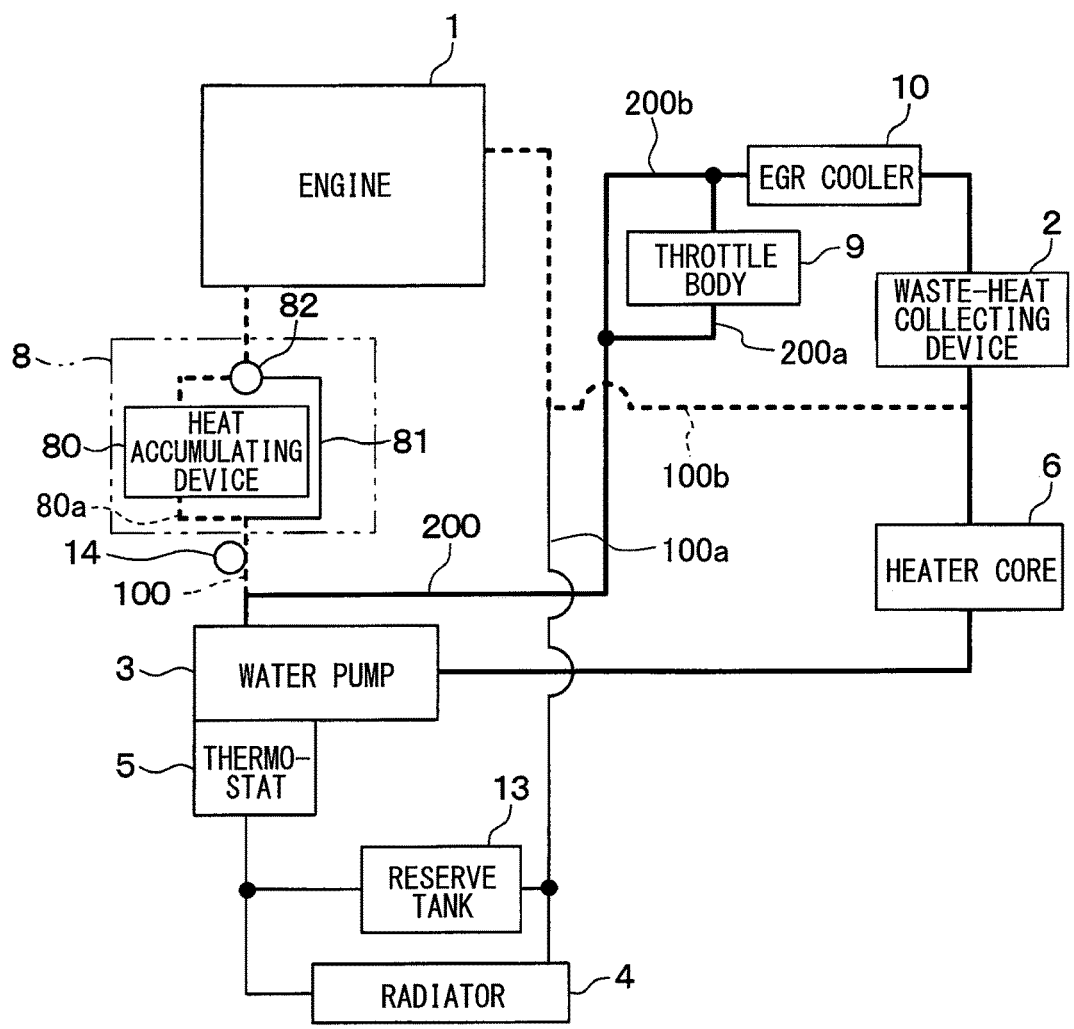
FIG. 5 is a block diagram showing respective flows of cooling water in each of water passages in a warm-up mode.
Figure 6:
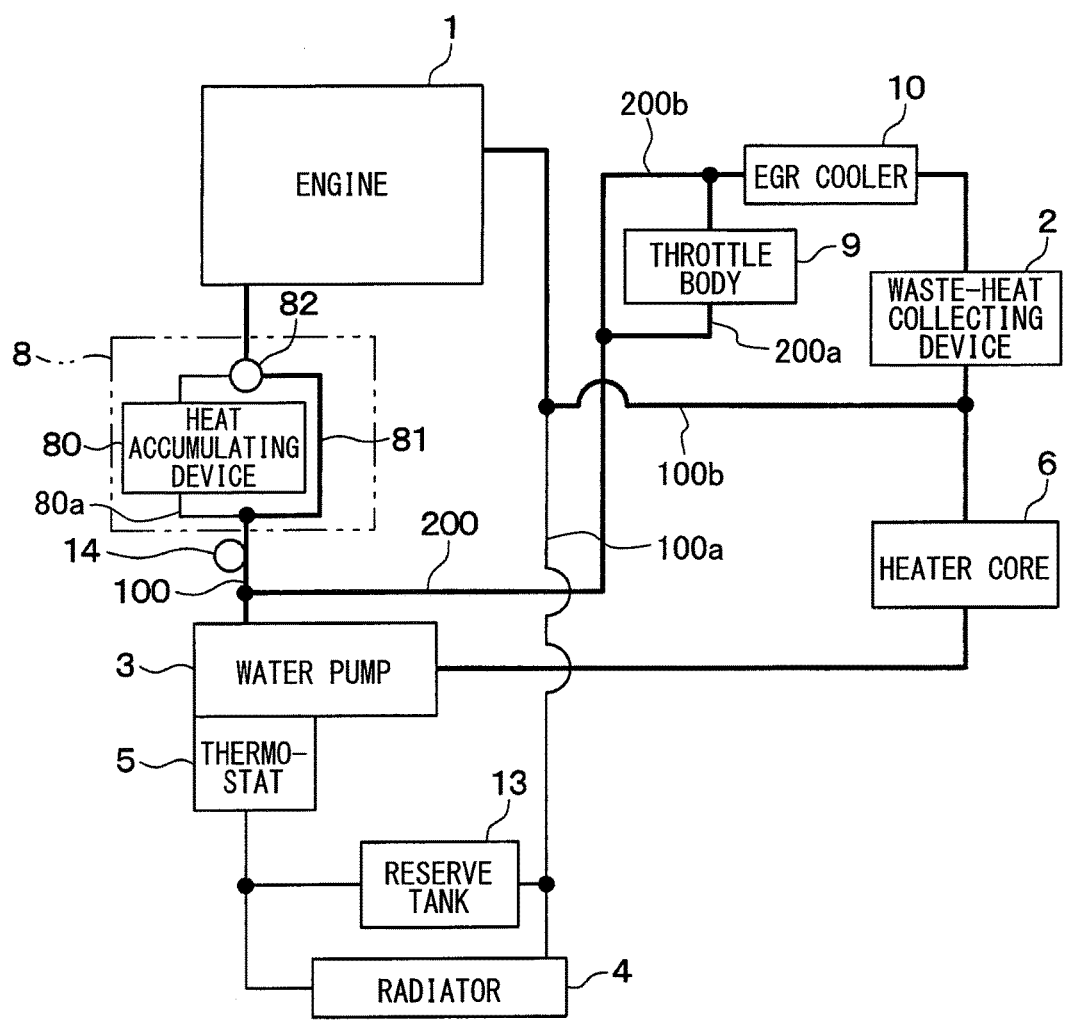
FIG. 6 is a block diagram likewise showing the respective flows of the cooling water in each of the water passages in a first cooling mode.
Figure 7:
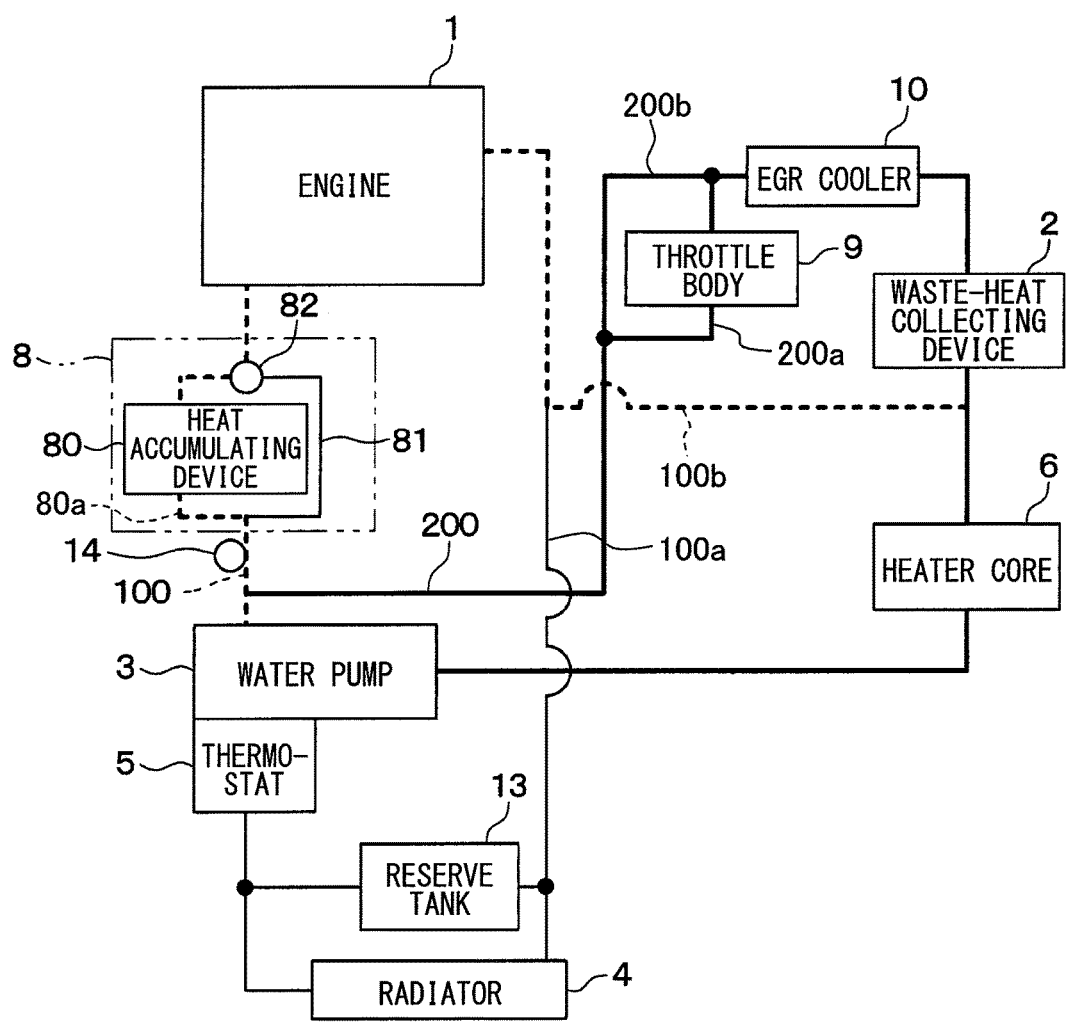
FIG. 7 is a block diagram likewise showing the respective flows of the cooling water in each of the water passages in a heat accumulating mode.
Figure 8:
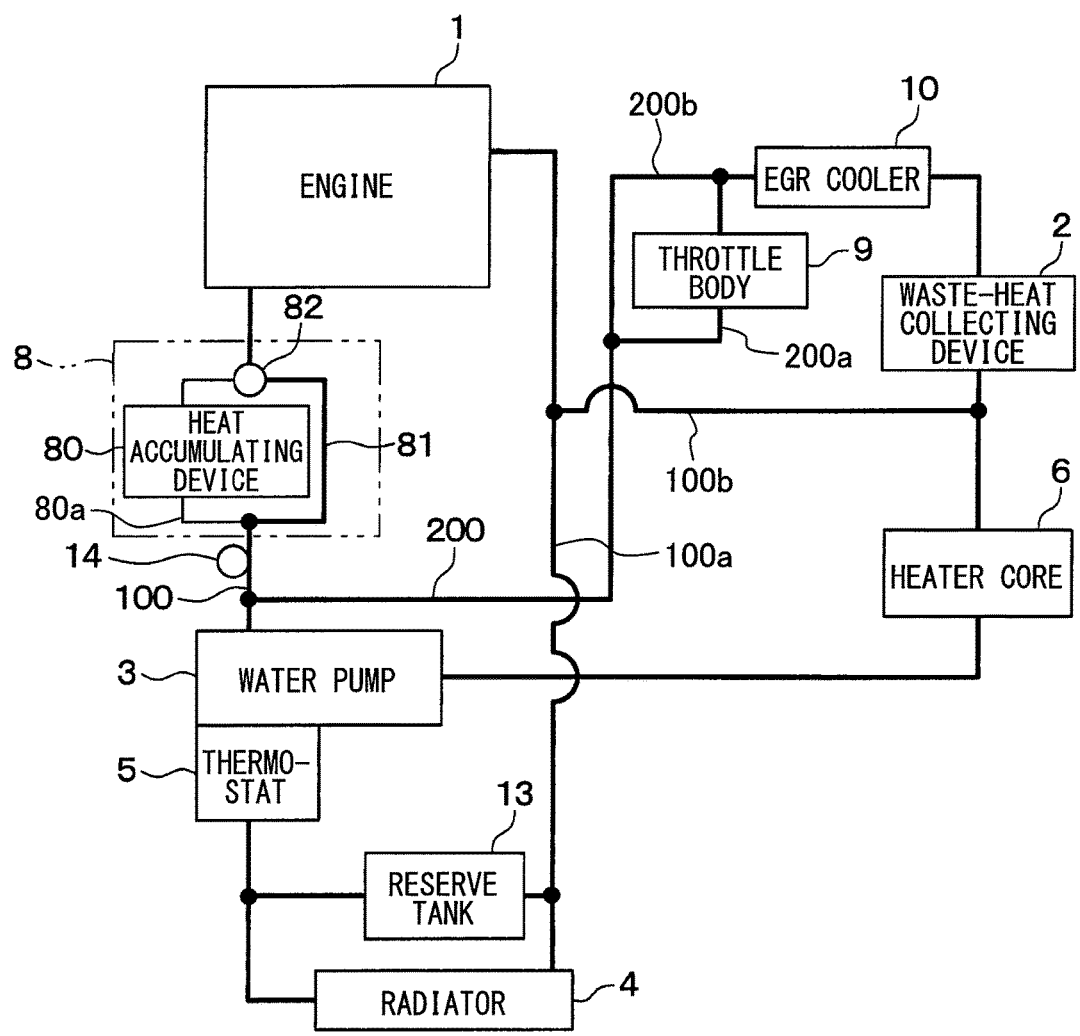
FIG. 8 is a block diagram further showing the respective flows of the cooling water in each of the water passages in a second cooling mode.

A control process carried out by the control unit 30 will be explained with reference to FIGS. 4 to 8. FIG. 4 is a flow chart showing a control process of the control unit 30. FIG. 5 is a diagram showing flow amounts of the cooling water in the respective water passages in the warm-up mode. FIG. 6 is a diagram showing the flow amounts of the cooling water in the respective water passages in the first cooling mode. FIG. 7 is a diagram showing the flow amounts of the cooling water in the respective water passages in the heat accumulating mode. FIG. 8 is a diagram showing the flow amounts of the cooling water in the respective water passages in the second cooling mode. In each of FIGS. 5 to 8, a heavy solid line indicates that the flow amount of the cooling water is large, a heavy dotted line indicates that the flow amount of the cooling water is small, and a thin line indicates that there is no flow of the cooling water.

The control unit 30 carries out the control process of FIG. 4 when an ignition switch. (not shown) for the vehicle is turned on. Each of steps in the flow chart of FIG. 4 respectively constitutes each of function realizing portions of the control unit 30.

At first, the control unit 30 reads out the operating condition of the engine 1 at a step S100. More exactly, the control unit 30 reads out the detection signal from the temperature sensor 14 for the cooling water and further reads out the engine operating signal from the engine ECU (not shown). The engine operating signal indicates whether the engine 1 is being operated or not.

The control unit 30 determines at a step S102 whether the temperature of the cooling water flowing into the warm-up device 8 is higher than (or equal to) a first threshold value. It is possible to identifying the temperature of the cooling water flowing into the warm-up device 8 based on the detection signal from the temperature sensor 14. The first threshold value corresponds to a temperature indicating a first-stage completion of a warm-up operation of the engine 1 and is set to a value lower than the predetermined value (105° C.), at which the thermostat 5 is opened.

When the temperature of the cooling water flowing into the warm-up device 8 is lower than the first threshold value, the determination of the control unit 30 at the step 3102 is NO. Then, the operating mode of the warm-up apparatus is changed to the warm-up mode and the control unit 30 operates the passage switching valve 82 at a step S104 in such a way that the cooling water pumped out from the water pump 3 is circulated through the heat accumulating device 80. As a result, the cooling water flows into the engine 1 via the heat accumulating device 80. In the warm-up mode, the cooling water does not flow through the accumulating-device bypassing passage 81, which bypasses the heat accumulating device 80.

In the above operating mode (the warm-up mode), as indicated by the heavy solid lines in FIG. 5, a large amount of the cooling water is circulated in the second cooling-water circuit 200. More exactly, the cooling water flows from the water pump 3 and back to the water pump 3 via the throttle body 9, the EGR cooler 10, the waste-heat collecting device 2, and the heater core 6. In addition, since the heat accumulating device 80 is so arranged as to be the fluid resistance against the flow of the cooling water flowing into the engine 1, a small amount of the cooling water is circulated in the first cooling-water circuit 100. More exactly, the cooling water flows in a circuit consisting of the water pump 3, the heat accumulating device 80 and the engine 1, and flows into the heater core 6, as indicated by the heavy dotted lines in FIG. 5. It is thereby possible to quickly increase the temperature of the cooling water to be circulated through the engine 1. Since the thermostat 5 is closed in this operating mode, the cooling water is not circulated in the water passages for the radiator 4 and the reserve tank 13, as indicated by the thin lines in FIG. 5.

When the temperature of the cooling water flowing into the warm-up device 8 becomes higher than the first threshold value, the determination of the control unit 30 at the step S102 becomes YES. Then, the process goes to a step S106, at which the control unit 30 further determines whether the temperature of the cooling water flowing into the warm-up device 8 is higher than a second threshold value or not. The second threshold value corresponds to a temperature indicating a second-stage completion of the warm-up operation of the engine 1. The second threshold value is higher than the first threshold value and set to a value lower than the predetermined value (105° C.), at which the thermostat 5 is opened.

When the temperature of the cooling water flowing into the warm-up device 8 is lower than the second threshold value, the determination of the control unit 30 at the step S106 is NO. Then, the operating mode of the warm-up apparatus is changed to the first cooling mode. More exactly, the control unit 30 operates the passage switching valve 82 at a step S108 in such a way that the cooling water pumped out from the water pump 3 is circulated through the accumulating-device bypassing passage 81, which bypasses the heat accumulating device 80. As a result, the cooling water flows into the engine 1 via the accumulating-device bypassing passage 81 without passing through the heat accumulating device 80.

In the above operating mode (the first cooling model), as indicated by the heavy solid lines in FIG. 6, a large amount of the cooling water flows in the second cooling-water circuit 200 from the water pump 3 and back to the water pump 3 via the first bifurcated passage 200a including the throttle body 9, the second bifurcated passage 200h bypassing the throttle body 9, the EGR cooler 10, the waste-heat collecting device 2 and the heater core 6. In addition, as also indicated by the heavy solid lines in FIG. 6, a large amount of the cooling water also flows in the first cooling-water circuit 100 from the water pump 3 and back to the water pump 3 via the accumulating-device bypassing passage 81 bypassing the heat accumulating device 80, the engine 1, the radiator bypassing passage 100b and the heater core 6. Since the thermostat 5 is still closed in this operation, the cooling water is not circulated in the water passages for the radiator 4 and the reserve tank 13, as indicated by the thin lines in FIG. 6.

When the temperature of the cooling water flowing into the warm-up device 8 becomes higher than the second threshold value, the determination of the control unit 30 at the step S106 becomes YES. Then, the process goes to a step S110, at which the control unit 30 further determines whether the engine 1 is in its operation or not. When the engine operation is stopped, a determination at the step S110 is NO and the operating mode of the warm-up apparatus is changed to the heat accumulating mode. More exactly, the process goes to a step S114, at which the control unit 30 determines whether the ignition switch for the vehicle is turned off or not. When the ignition switch is in a turned-on condition, that is, when the determination at the step S114 is NO, the process further goes to a step S116. The control unit 30 operates the passage switching valve 82 at the step S116 in such a way that the cooling water pumped out from the water pump 3 is circulated through the heat accumulating device 80. As a result, the cooling water pumped out from the water pump 3 flows into the engine 1 via the heat accumulating device 80, while the cooling water does not pass through the accumulating-device bypassing passage 81.

In the above operating mode (the heat accumulating mode), as indicated by the heavy solid lines in FIG. 7, a large amount of the cooling water flows in the second cooling-water circuit 200 from the water pump 3 and back to the water pump 3 via the first bifurcated passage 200a including the throttle body 9, the second bifurcated passage 200b bypassing the throttle body 9, the EGR cooler 10, the waste-heat collecting device 2 and the heater core 6. In addition, as indicated by the heavy dotted lines in FIG. 7, a small amount of the cooling water flows in the first cooling-water circuit. 100 from the water pump 3 and back to the water pump 3 via the heat accumulating device 80, the engine 1, the radiator bypassing passage 100b and the heater core 6. Accordingly, the heat accumulating device 80 accumulates the heat from the cooling water of high temperature, which is pumped out from the water pump 3. More exactly, the waste heat collected by the waste-heat collecting device 2 from the exhaust gas of the engine 1 is accumulated in the heat accumulating device 80. Since the thermostat 5 is still closed in this operation (the heat accumulating mode), the cooling water is not circulated in the water passages for the radiator 4 and the reserve tank 13, as indicated by the thin lines in FIG. 7.

When the engine operation is in its operating condition, the determination at the step S110 is YES. Then, the operating mode of the warm-up apparatus is changed to the second cooling mode. In other words, the control unit 30 operates the passage switching valve 82 at a step S112 in such a way that the cooling water pumped out from the water pump 3 is circulated, through the accumulating-device bypassing passage 81, which bypasses the heat accumulating device 80. As a result, the cooling water flows into the engine 1 via, the accumulating-device bypassing passage 81 without passing through the heat accumulating device 80. When the temperature of the cooling water becomes higher than the predetermined value (for example, 105° C.), the thermostat 5 is opened so that the cooling water is circulated through the radiator 4.

In the above operating mode (the second cooling mode), as indicated by the heavy solid lines in FIG. 8, a large amount of the cooling water flows in the second cooling-water circuit 200 from the water pump 3 and back to the water pump 3 via the first bifurcated passage 200a including the throttle body 9, the second bifurcated passage 200b bypassing the throttle body 9, the EGR cooler 10, the waste-heat collecting device 2 and the heater core 6. In addition, as indicated by the heavy dotted lines in FIG. 8, a large amount of the cooling water flows in the first cooling-water circuit 100 from the water pump 3 and back to the water pump 3 via the accumulating-device bypassing passage 81, the engine 1, the radiator bypassing passage 100b and the heater core 6. As indicated by the thin lines in FIG. 8, the cooling water does not pass through the heat accumulating device 80.

When the ignition switch for the vehicle is in a turned-off condition, that is, YES at the step S114, the process of FIG. 4 goes to an end.

According to the above explained structure of the present embodiment, the warm-up device 8 is so arranged in the first and the second cooling-water circuits 100 and 200 as to be the fluid resistance against the flow of the cooling water flowing into the engine 1. The warm-up device 8 heats the cooling water flowing into the engine 1 during the cold start-up operation of the engine 1. More exactly, it is possible to heat the cooling water flowing into the engine 1 during the cold start-up operation of the engine 1, while the flow amount of the cooling water flowing into the engine 1 is suppressed to the smaller amount. In other words, it is possible to more quickly warm up the engine 1, when compared with a case in which the cooling water is heated by heat generated by the engine itself.

The warm-up device 8 has the heat accumulating device 80, in which the heat is exchanged between the cooling water and the heat accumulating material 801 for accumulating the waste heat of the engine 1. Accordingly, it is possible to heat the cooling water flowing into the engine 1 during the cold start-up operation of the engine 1 by use of the heat accumulating device 80 having the heat accumulating material 801.

The warm-up device 8 further has the passage switching valve 82, which switches the water passage for the cooling water flowing into the engine 1 from the heat accumulating passage 80a having the heat accumulating device 80 to the accumulating-device bypassing passage 81 bypassing the heat accumulating device 80, or vice versa. In addition, the warm-up apparatus of the present embodiment has the control unit 30 for controlling the engine cooling operation, which controls the passage switching valve 92 in such a way that the cooling water is circulated through the accumulating-device bypassing passage 81 during the normal engine operating period (the first and the second cooling modes) other than the cold start-up operation of the engine 1 on one hand and that the cooling water is circulated through the heat accumulating device 80 during the cold start-up operation (the warm-up mode) of the engine 1 on the other hand.

Accordingly, it is possible to cool the engine 1 at a maximum by circulating the cooling water flowing into the engine 1 through the accumulating-device bypassing passage 81 during the normal running condition of the vehicle on one hand (the first and the second cooling modes). On the other hand, it is possible to heat the cooling water flowing into the engine 1 by circulating the cooling water through the heat accumulating device 80 during the cold start-up operation of the engine 1 (the warm-up mode). As a result, it becomes possible to improve the fuel consumption ratio and to realize a comfortable air conditioning operation for the vehicle.

The control unit 30 controls the passage switching valve 82 in such a way that the cooling water flowing into the warm-up device 8 is circulated through the heat accumulating device 80 when the temperature of the cooling water flowing into the warm-up device 8 is lower than the first threshold value (the temperature indicating the first-stage completion of the warm-up operation).

According to the above operation (the warm-up mode), it is possible to heat the cooling water flowing into the engine 1 by circulating the same through the heat accumulating device 80, when the temperature of the cooling water flowing into the warm-up device 8 is lower than the temperature indicating the first-stage completion of the warm-up operation.

In addition, the control unit 30 controls the passage switching valve 82 in such a way that the cooling water flowing into the warm-up device 8 is circulated through the accumulating-device bypassing passage 81 when the temperature of the cooling water flowing into the warm-up device 8 is higher than the first threshold value but lower than the second threshold value (the temperature indicating the second-stage completion of the warm-up operation), wherein the second threshold value is higher than the first threshold value.

According to the above operation (the first cooling mode), it is possible to stably complete the warm-up operation of the engine 1 at a middle temperature range (between the first and the second threshold values), in addition, it is possible to prevent a decrease of the flow amount of the cooling water flowing into the engine 1. In other words, it is possible to avoid a situation that the cooling water flowing into the engine 1 is heated by the heat accumulating device 80 more than necessary.

The control unit 30 controls the passage switching valve 82 in such a way that the cooling water flowing into the warm-up device 8 is circulated through the heat accumulating device 80 when the temperature of the cooling water flowing into the warm-up device 8 is higher than the second threshold value and when the engine operation is stopped, so that the heat accumulating mode is carried out.

According to the above operation, it is possible to accumulate the waste heat of the engine 1 in the heat accumulating device 80 by circulating the cooling water through the heat accumulating device 80, when the engine operation is stopped, for example, the engine operation is temporarily stopped because of the idling-stop operation, that is, when it is not necessary to cool the engine 1 or when necessity for cooling the engine 1 is low.

The control unit 30 further controls the passage switching valve 82 in such a way that the cooling water flowing into the warm-up device 8 is circulated through the accumulating-device bypassing passage 81 when the temperature of the cooling water flowing into the warm-up device 8 is higher than the second threshold value and when the engine is in its operation, so that the second cooling mode is carried out.

As above, it is possible to avoid a decrease of the flow amount of the cooling water flowing into the engine 1, when it is necessary to cool the engine 1. It is, therefore, possible to effectively cool down the engine 1.

The warm-up apparatus of the present embodiment has the radiator 4 for cooling down the cooling water and the thermostat 5 for circulating the cooling water through the radiator 4 when the temperature of the cooling water flowing into the warm-up device 8 (the heat accumulating device 80 or the accumulator bypassing passage 81) is higher than the predetermined value (for example, 105° C.). The second threshold value is set to the value lower than the predetermined value. The predetermined value is also referred to as a third threshold value.

When the temperature of the cooling water detected by the thermostat 5 is higher than the predetermined value (the third threshold value), the cooling water is circulated through the radiator 4 in the second cooling mode, as shown in FIG. 8. Since the second threshold value is lower than the predetermined value (the third threshold value), it is possible to accumulate the heat in the heat accumulating device 80 without throwing, away heat energy which can be accumulated.

The flow amount of the cooling water flowing into the engine 1 through the accumulating-device bypassing passage 81 (for example, in the first or the second cooling mode) is larger than the flow amount of the cooling water flowing into the engine 1 through the heat accumulating device 80 (for example, in the heat accumulating mode). It is thereby possible to prevent a decrease of a cooling performance for the engine 1.

The engine cooling-water circuit is composed of the first cooling-water circuit 100 for circulating the cooling water through the engine 1 and the second cooling-water circuit 200 for circulating the cooling water not through the engine 1. The warm-up device 8 is located in the first cooling-water circuit 100.

As above, it is possible in the present embodiment to locate the warm-up device 8 in the first cooling-water circuit 100, among the first cooling-water circuit 100 in which the cooling water is circulated through the engine 1 and the second cooling-water circuit 200 in which the cooling water is circulated without passing through the engine 1.

At least one of the following components is provided in the second cooling-water circuit 200; (i) the throttle body 9 for the engine 1, (ii) the EGR cooler 10 for cooling down the exhaust gas to be re-circulated from the exhaust system into the intake system of the engine 1, (iii) the waste-heat collecting device 2 for heating the cooling water by the heat of the exhaust gas from the engine 1, and (iv) the heater core 6 for heating the air to be supplied into the passenger compartment of the vehicle for the air conditioning purpose. The cooling water of a predetermined amount is circulated in the second cooling-water circuit 200, even when the cooling water is circulated through the heat accumulating device 80 provided in the first cooling-water circuit 100. As a result, it is possible to effectively accumulate the heat in the heat accumulating device 80 by use of the waste heat from the respective components, including the heat from the exhaust gas of the engine 1.

The heat accumulating device 80, which accommodates the heat accumulating material 801, has the heat accumulating housing 802 and the heat insulating member 803 for suppressing the heat transfer between the inside and the outside of the heat accumulating housing 802. The heat accumulating material 801 is composed of such material, which can accumulate the heat by the phase change from the solid state to the liquid state or the electronic phase transition. Accordingly, it is possible to hold the heat-accumulated condition of the heat accumulating device 80 for a longer period. For example, it is possible to maintain the heat accumulated in the heat accumulating device 80 in the preceding day until the following day.

In addition, the water pump 3 is provided, which can circulate the cooling water in the first and/or the second cooling-water circuits 100 and 200 even when the engine operation is temporarily stopped. It is therefore possible to accumulate the heat in the heat accumulating device 80 independently from the engine operation.

Second Embodiment

Figure 9:
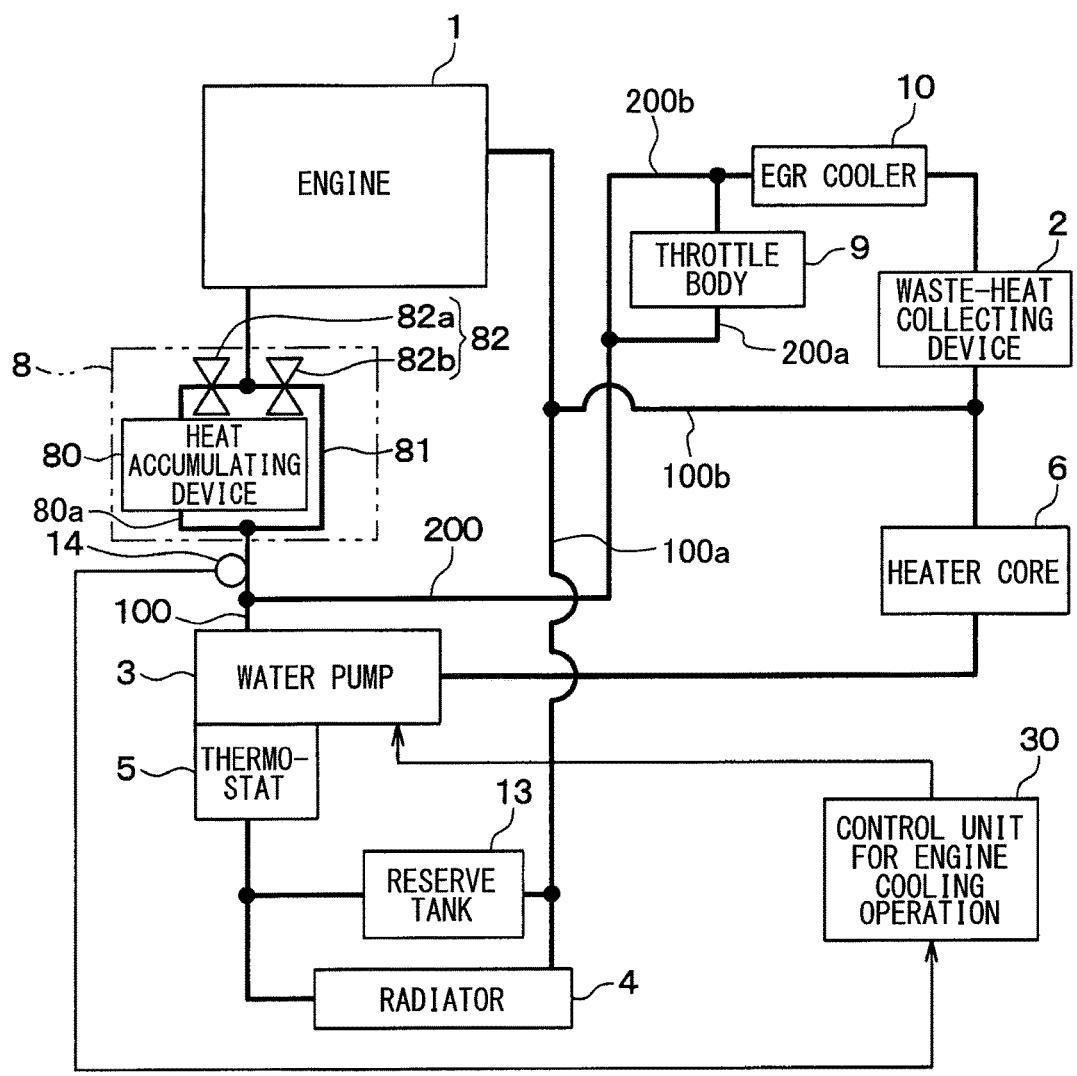
FIG. 9 is a block diagram showing a structure of a cooling-water circuit of the engine warm-up apparatus for the automotive vehicle according to a second embodiment of the present disclosure.

An engine warm-up apparatus for the vehicle according to a second embodiment of the present disclosure will be explained with reference to FIG. 9. In the first embodiment, the passage switching valve 82 is composed of the three-way valve. In the present (second) embodiment, the passage switching valve 82 is composed of two two-way valves (a first switching valve 82a and a second switching valve 82b).

The first switching valve 82a of the two-way valve is arranged in the heat accumulating passage 80a, through which the cooling water is circulated via the heat accumulating device 80 of the warm-up device 8. The second switching valve 82b of the two-way valve is provided in the accumulating-device bypassing passage 81, which bypasses the heat accumulating device 80 of the warm-up device 8. Each of the first and the second switching valves 82a and 82b is controlled by a control signal from the control unit 30.

The control unit 30 controls the passage switching valve 82 (the first and the second switching valves 82a and 82b) in such a way that the cooling water pumped out from the water pump 3 is circulated through the heat accumulating device 80, when the operating condition of the warm-up apparatus is in the warm-up mode or in the heat accumulating mode. More exactly, the first switching valve 82a is opened and the second switching valve 82b is closed so that the cooling water flows from the water pump 3 into the engine 1 via the heat accumulating device 80.

In addition, the control unit 30 controls the passage switching valve 82 (the first and the second switching valves 82a and 82b) in such a way that the cooling water pumped out from the water pump 3 is circulated through the accumulating-device bypassing passage 81, when the operating condition of the warm-up apparatus is in the first cooling mode or in the second cooling mode. More exactly, the first switching valve 82a is closed and the second switching valve 82b is opened so that the cooling water flows from the water pump 3 into the engine 1 without passing through the heat accumulating device 80.

Alternatively, the control unit 30 can control the passage switching valve 82 in such a way that the cooling water flowing into the warm-up device 8 is circulated through both of the heat accumulating passage 80a and the accumulating-device bypassing passage 81, when the temperature of the cooling water flowing into the warm-up device 80 is higher than a predetermined temperature. According to such an operation, it is possible to decrease pressure loss in the warm-up device 8 to thereby make smaller a driving force for the water pump 3.

In the second embodiment, the same advantages to the first embodiment can be obtained.

Third Embodiment

An engine warm-up apparatus for the vehicle according to a third embodiment of the present disclosure will be explained with reference to FIG. 10.

In the first embodiment, the heat accumulating material 801 of the capsule type is used for the heat accumulating device 80. In the present third embodiment, the heat accumulating material 801 of a laminated heat-exchanger type is used in the heat accumulating device 80.

The heat accumulating device 80 is composed of multiple laminated plates 801a, the housing 802 of a tube shape for accommodating the multiple laminated plates 801a, and the heat insulating member 803 covering the outer periphery of the housing 802. In the present embodiment, the latent-heat accumulating material is used for the heat accumulating material 801, wherein the latent heat generated by the phase change from the solid state to the liquid state is used.

Each of the laminated plates 801a is formed in the tube shape and the multiple laminated plated 801a are arranged, in the housing 802 in a laminated condition. The heat accumulating material 801 is accommodated in the laminated plate 801a.

The cooling water flows into the housing 802 accommodating the heat, accumulating material 801 via the inlet port 802a, passes through gaps between the neighboring laminated plates 801a and flows out from the housing 802 via the outlet port 802b.

In the third embodiment, the same advantages to the first embodiment can be also obtained.

Fourth Embodiment

Figure 11:
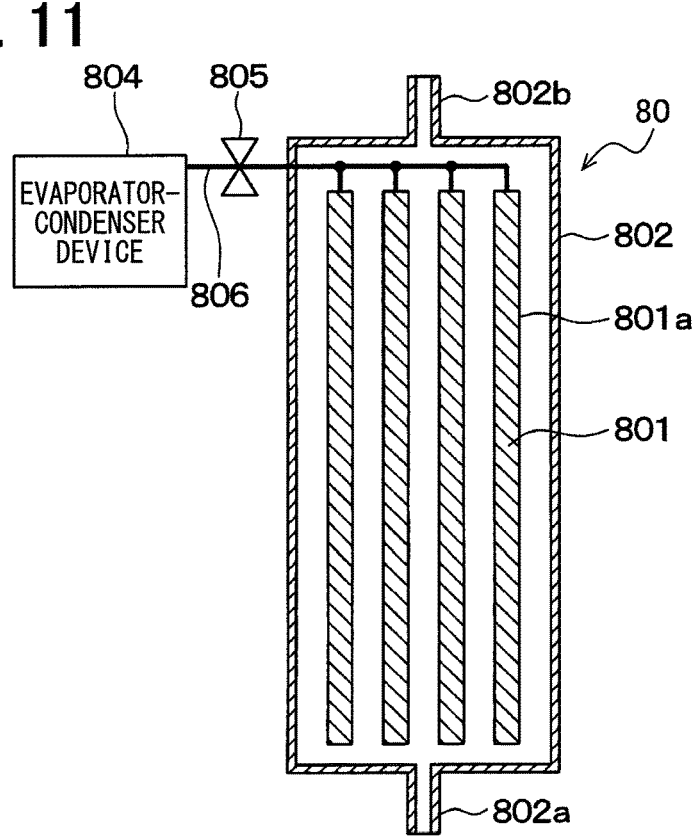
FIG. 11 is a schematic cross sectional view showing a heat accumulating device of the engine warmup apparatus for the automotive vehicle according to a fourth embodiment of the present disclosure.

An engine warm-up apparatus for the vehicle according to a fourth embodiment of the present disclosure will be explained with reference to FIG. 11. In the first embodiment, the latent-heat accumulating material is used for the heat accumulating material 801, wherein the latent heat generated by the phase change from the solid state to the liquid state is used.

In the present embodiment, chemical heat accumulating material is used for the heat accumulating material 801, wherein heat is derived out by use of reaction heat of material and the heat is accumulated by heat decomposition of the material.

Figure 10:
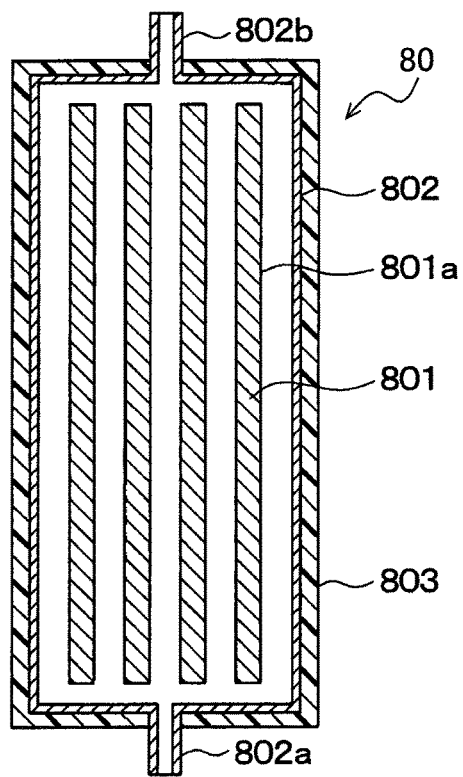
FIG. 10 is a schematic cross sectional view showing a heat accumulating device of the engine warm-up apparatus for the automotive vehicle according to a third embodiment of the present disclosure.

In a similar manner to the third embodiment shown in FIG. 10, the heat accumulating device 80 is composed of the multiple laminated plates 801a, the housing 802 of the tube shape for accommodating the multiple laminated plates 801a, an evaporator-condenser device 804, a pipe 806 for connecting the heat accumulating housing 802 to the evaporator-condenser device 804, a valve 805 for closing or opening the pipe 806, and so on. In the present embodiment, the laminated plates 801a correspond to a casing for the chemical heat accumulating material.

Each of the laminated plates 801a is formed in the tube shape and arranged in the housing 802 in the laminated structure. The heat accumulating material 801 is accommodated in the laminated plates 801a.

The cooling water flows into the housing 802 accommodating the heat accumulating material 801 via the inlet port 802a, passes through the gaps between the neighboring laminated plates 801a and flows out from the housing 802 via the outlet port 802b.

As explained above, the heat accumulating material 801 of the present embodiment uses the chemical heat accumulating material. The heat accumulating material 801 accumulates the heat by dehydration reaction and radiates the heat by hydration reaction.

The heat accumulating material 801 of the present embodiment is composed of, for example, calcium oxide/calcium hydroxide (CaO/Ca(OH)2). The calcium oxide is one of alkaline-earth metal oxides. In the laminated plates 801a, the heat accumulation and the heat radiation are carried out in a reversible fashion, as below.

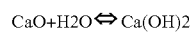

$$CaO + H_2O \Leftrightarrow Ca(OH)_2$$

Any other material than calcium oxide can be used for the chemical heat accumulating material 801, which carries out the heat accumulation and the heat radiation in the reversible fashion.

The evaporator-condenser device 804, the pipe 806 and the valve 805 are located outside of the housing 802. The pipe 806 connects the evaporator-condenser device 804 to each of the laminated plates 801a. The valve 805 is provided at an intermediate position of the pipe 806 in order to close or open the passage between the evaporator-condenser device 804 and the laminated plates 801a. The valve 805 is operated by a command signal from the control unit 30 for the engine cooling operation.

The evaporator-condenser device 804 stores water, which is reaction liquid of the heat accumulating material 801, wherein the water is evaporated in the device 804 on one hand and steam flowing from the laminated plates 801a is condensed in the device 804 on the other hand. In other words, the evaporator-condenser device 804 is a heat exchanger for exchanging heat between the water or the steam in the device 804 and fluid flowing outside of the evaporator-condenser device 804.

Before starting the heat accumulation, each of the laminated plates 801a is filled with the heat accumulating material 801in a condition of Ca (OH) 2. When the heat (the waste heat of the engine) is applied to the laminated plates 801a, the dehydration reaction is carried out so that Ca (OH)2 is decomposed to CaO and $H_2O$.

When the valve 805 is opened by the command signal from the control unit 30, the steam generated in the laminated plates 801a is moved to the evaporator-condenser device 804 via the pipe 806 and the valve 805.

The steam is condensed in the evaporator-condenser device 804 and pooled therein as the water. The waste heat is continuously applied to the laminated plates 801a until the dehydration reaction is completed. The valve 805 is closed by the command signal from the control unit 30 when the dehydration reaction is completed. Then, CaO is physically separated from $H_2O$. In other words, $H_2O$ is accumulated in the evaporator-condenser device 804, while CaO remains in the laminated plates 801a. The heat accumulation is completed and such a heat accumulated condition is maintained.

When starting the heat radiation, the valve 805 is opened by the command signal from the control unit 30 in order to connect the evaporator-condenser device 804 to each of the laminated plates 801a. In the evaporator-condenser device 804, the steam is generated by an outside heat source and such steam is supplied to each of the laminated plates 801a via the pipe 806 and the valve 805. As a result, the hydration reaction is carried out, so as to make chemical bond between. H2O and CaO in the laminated plates 801a and thereby generate the heat. The reversible heat accumulation and heat radiation is carried out by repeating the above operations.

Accordingly, it is possible to heat the cooling water flowing into the engine 1 by the heat accumulating device 80, when the dehydration reaction is carried out in the heat accumulating material 801 before starting the engine operation and when the valve 805 is opened at starting the engine operation in order to carry out the hydration reaction in the heat accumulating material 801. As a result, it is possible to realize a quick warm-up operation for the engine 1.

As explained above, the heat accumulating material 801 is composed of the chemical heat accumulating material, which carries out the heat accumulation and the heat radiation in the reversible fashion by the chemical reaction with the water (or ammonia).

In addition, the heat accumulating device 80 has the laminated plates 801a (the casing 801a for the chemical heat accumulating material 801) for accommodating the chemical accumulating material 801, and the pipe 806 connected to the inside of the respective casings 801a. Furthermore, the heat accumulating device 80 has the heat exchanger 804 (the evaporator-condenser device 804), which is connected to the inside of the respective casing 801a via the pipe 806 and which brings out the water (or ammonia) separated in the inside of the casing 801a from the heat accumulating material 801 and evaporates or condenses it.

According to the above operation, since it is possible to radiate the heat by the chemical reaction between the chemical heat accumulating material 801 and the water (or ammonia), it is possible to heat the cooling water by carrying out the chemical reaction at starting the engine operation.

As explained above, in the present embodiment, the heat is radiated by the chemical reaction between the chemical heat accumulating material and the water (or ammonia). In other words, it is possible to use the heat accumulating device 80 as a heat radiating device, which can radiate the heat when it is necessary. As a result, it is not necessary in the present embodiment to provide the heat insulating member 803 like the first or the second embodiment.

In the present embodiment, the calcium oxide which is one of the alkaline-earth metal oxides is used as the chemical heat accumulating material in order to use the reaction heat between the calcium oxide and the water. However, reaction heat produced by the reaction between transition metal oxide and water, or reaction heat produced by the reaction between representative metal oxide and water can be used. Alternatively, reaction heat of reaction between alkaline metal chloride and ammonia, reaction heat of reaction between alkaline-earth metal chloride and ammonia, reaction heat of reaction between transition metal element chloride and ammonia or the like can be used as the heat to be generated by the chemical heat accumulating material.

Fifth Embodiment

Figure 12:
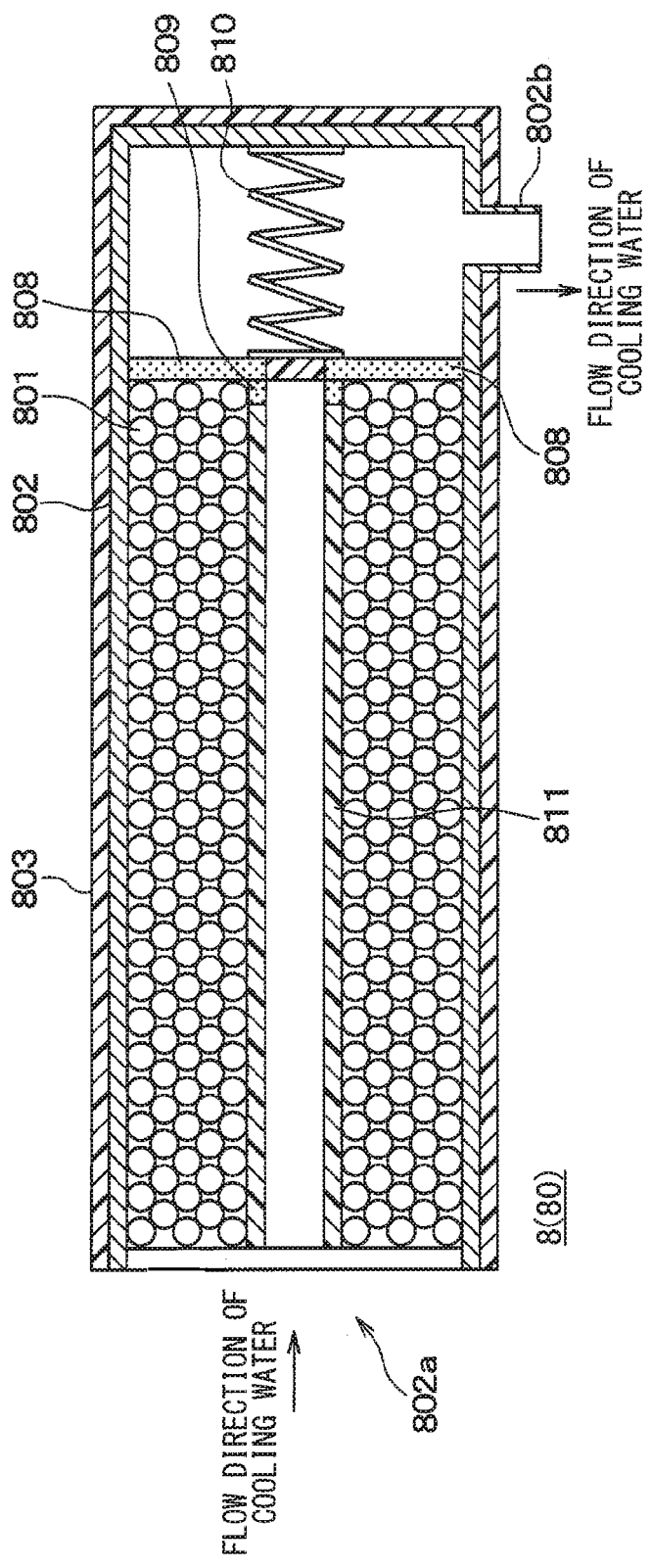
FIG. 12 is a schematic cross sectional view showing a heat accumulating device of the engine warm-up apparatus for the automotive vehicle according to a fifth embodiment.
Figure 13:
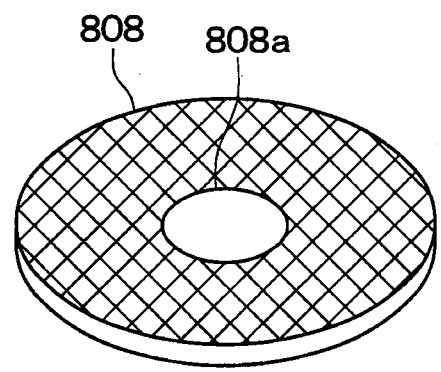
FIG. 13 is a schematic cross sectional view showing a movable member of the heat accumulating device of the engine warm-up apparatus for the automotive vehicle according to the fifth embodiment.

A warm-up apparatus for the vehicle according to a fifth embodiment of the present disclosure will be explained with reference to FIGS. 12 to 14. FIG. 12 is a schematic cross sectional view showing the heat accumulating device 80 in a condition that the heat accumulating material 801 is contracted. FIG. 13 is a schematic external view showing a movable member of the heat accumulating device 80. FIG. 14 is a schematic cross sectional view showing the heat accumulating device 80 in a condition that the heat accumulating material 801 is expanded.

In the first embodiment, the passage switching valve 82 switches over the circulation condition of the cooling water in accordance with the control signal from the control unit 30, so that the cooling water from the water pump 3 is circulated either through the heat accumulating device 80 or through the accumulating-device bypassing passage 81. However, according to the warm-up device of the present embodiment, the flow amount of the cooling water flowing from the water pump 3 to the heat accumulating device 80 is adjusted by use of expansion and contraction of the heat accumulating material 801.

The heat accumulating device 80 of the present embodiment is composed of the heat accumulating material 801 of the capsule type, the housing 802 of the cylindrical shape for accommodating the heat accumulating material 801, the heat insulating member 803 arranged at the outside of the housing 802, an expansion-contraction member 809 and so on. In addition, the heat accumulating device 80 has a movable member 808 movable in an axial direction of the housing 802 depending on a volume change of the heat accumulating material 801 and a spring 810 for biasing the movable member 808 in the axial direction from one of axial ends to an opposite-side axial end of the housing 802. A cylindrical pipe member 811 is provided in the housing 802. A bypass passage is formed in the cylindrical pipe member 811.

The heat accumulating material 801 of the present embodiment is composed of the latent-heat accumulating material, in the same manner to the first embodiment. The heat accumulating material 801, which is in the solid state at a low temperature, is changed to the liquid state when the temperature is increased, so that the heat accumulating material 801 is expanded. In other words, the volume of the heat accumulating material 801 is increased when it is liquefied.

Each of the movable member 808 and the expansion-contraction member 809 is composed of nonwoven cloth having a porous structure, so that the cooling water can pass through it.

As shown in FIG. 13, the movable member 808 has a disc-shape plate portion 808a at a center of the movable member 808. The cooling water cannot pass through the disc-shape plate portion 808a. The expansion-contraction member 809 is formed in a bellows shape. One axial end of the expansion-contraction member 809 is fixed to one of axial ends of the cylindrical pipe member 811, while another axial end of the expansion-contraction member 809 is fixed to an outer periphery of the disc-shape plate portion 808a.

The heat accumulating material 801 is in the contracted condition, when the temperature of the cooling water flowing into the heat accumulating device 80 is as low as the ambient temperature, in particular when starting the engine operation in the cold start-up condition. As shown in FIG. 12, the expansion-contraction member 809 is in the contracted state, when the cooling water is cold as above. The cooling water flowing into the housing 802 via the inlet port 802a passes through the gaps among the heat accumulating material 801 and penetrates into the movable member 808. Then, the cooling water seeps through the movable member 808 toward the outlet port 802b. The cooling water flowing into the cylindrical pipe member 811 cannot pass through the movable member 808 due to the disc-shape plate portion 808a.

When the temperature of the cooling water flowing into the heat accumulating device 80 is increased in accordance with the engine operation, the heat accumulating material 801 is expanded and the movable member 808 is biased by the expansion of the heat accumulating material 801 in the axial direction to the spring 810. When the biasing force by the expansion of the heat accumulating material 801 becomes larger than the spring force of the spring 810, the movable member 808 is moved in the direction to the spring 810, as shown in FIG. 14, and the expansion-contraction member 809 is expanded.

Then, the cooling water flowing into the housing 802 via the inlet port 802a passes through the gaps among the heat accumulating material 801 and reaches the movable member 808. The cooling water enters the movable member 808 and sweeps through the movable member 808 to the outlet port 802b. In addition, the cooling water flowing into the cylindrical pipe member 811 (the bypass passage) passes through the expansion-contraction member 809 and passes through the gaps among the heat accumulating material 801. The cooling water further passes through the movable member 808 and flows to the outlet port 802b. Accordingly, a larger amount of the cooling water flows through the heat accumulating device 80, when compared with the case in which the expansion-contraction member 809 is contracted. As above, it is possible in the present embodiment to adjust the flow amount of the cooling water passing through the heat accumulating device 80 depending on the volume change of the heat accumulating material 801.

In the present embodiment, the heat accumulating device 80 uses the material, which is changed from the solid state to the liquid state, or vice versa, and the warm-up device 8 changes the flow amount of the cooling water flowing into the engine 1 depending on the volume change caused by the solid-liquid phase change of the heat accumulating material 801.

In the present embodiment, therefore, it is not necessary to provide the passage switching valve 82 provided in the first to the third embodiments. In other words, it is possible in the present embodiment to make the structure of the warm-up device 8 simpler.

The same advantages to the first embodiment can be also obtained in the present embodiment.

Modifications (1) In the above embodiments, the present disclosure is applied to the warm-up device for warming-up the engine 1 of the vehicle, wherein the engine 1 is used as the driving source for the vehicle. The warm-up apparatus of the present disclosure can be applied to a hybrid vehicle having an electric motor and an engine for driving the vehicle. In addition, the present disclosure can be applied to a vehicle, which does not have the idling-stop function.

(2) In the first embodiment, the control unit 30 determines at the step S102 whether the temperature of the cooling water flowing into the warm-up device 8 is higher than the first threshold value. It can be so modified that a temperature sensor is provided so as to detect temperature of the cooling water flowing out from the engine 1 and the control unit 30 determines whether the temperature is higher than the first threshold value corresponding to the temperature indicating the first-stage completion of the warm-up operation).

(3) In the first embodiment, the control unit 30 determines at the step S106 whether the temperature of the cooling water flowing into the warm-up device 8 is higher than the second threshold value. It can be likewise so modified that a temperature sensor is provided so as to detect temperature of the cooling water flowing out from the engine 1 and the control unit 30 determines whether the temperature is higher than the second threshold value (corresponding to the temperature indicating the second-stage completion of the warm-up operation).

(4) In the first embodiment, the heat accumulating material 801 is composed of the latent-heat accumulating material, which accumulates the heat generated by the phase change from the solid state to the liquid state. However, the heat accumulating material can be composed of such material which accumulates heat generated by electronic phase transition. For example, material belonging to vanadium oxide series can be used.

The present disclosure is not limited to the above embodiments and/or modifications but can be further modified in various manners without departing from the spirit of the present disclosure.

In the present disclosure, any one of the embodiments or the modifications can be combined to the other embodiment or modification.

What is claimed is:

1. An engine warm-up apparatus for a vehicle comprising:
   a cooling-water circuit for circulating cooling water through an engine of the vehicle;
   a warm-up device arranged in the cooling-water circuit in such a way that the warm-up device works as a fluid resistance for a flow of the cooling water flowing into the engine, wherein the warm-up device operatively heats the cooling water during a start-up operation of the engine,
   wherein the warm-up device comprises:
   (i) a heat accumulating device having heat accumulating material for carrying out heat exchange between the cooling water and the heat accumulating material in order that waste heat of the engine is accumulated in the heat accumulating material and/or heat accumulated in the heat accumulating material is radiated to the cooling water;
   (ii) a passage switching device for switching a water passage for the cooling water flowing into the engine from a heat accumulating passage in which the cooling water flows through the heat accumulating device to an accumulating-device bypassing passage in which the cooling water bypasses the heat accumulating device, or vice versa; and
   (iii) an electronic control unit for controlling the passage switching device in such a way that:

(iii-a) the cooling water is circulated through the heat accumulating device when a temperature of the cooling water flowing into the warm-up device is lower than a first threshold value during the start-up operation of the engine, wherein the first threshold value corresponds to a temperature indicating a first-stage completion of a warm-up operation of the engine;

(iii-b) the cooling water is circulated through the accumulating-device bypassing passage when the engine is in its operation and when the temperature of the cooling water flowing into the warm-up device is higher than the first threshold value but lower than a second threshold value, wherein the second threshold value corresponds to a temperature indicating a second-stage completion of the warm-up operation of the engine and the second threshold value is higher than the first threshold value; and (iii-c) the cooling water is circulated through the heat accumulating device when the temperature of the cooling water flowing into the warm-up device is higher than the second threshold value and when the operation of the engine is temporarily stopped.

2. The engine warm-up apparatus according to claim 1, wherein
the electronic control unit further controls the passage switching device in such a way that the cooling water flowing into the warm-up device is circulated through the accumulating-device bypassing passage, when the temperature of the cooling water flowing into the warm-up device is higher than the second threshold value during the engine is in its operation.

3. The engine warm-up apparatus according to claim 1, further comprising:
a radiator provided in the cooling-water circuit for cooling down the cooling water; and
a thermostat for circulating the cooling water through the radiator when the temperature of the cooling water flowing into the warm-up device is higher than a third threshold value,
wherein the third threshold value is higher than the second threshold value.

4. The engine warm-up apparatus according to claim 1, wherein
a flow amount of the cooling water flowing into the engine via the accumulating-device bypassing passage is larger than a flow amount of the cooling water flowing into the engine via the heat accumulating device.

5. The engine warm-up apparatus according to claim 1, wherein
the cooling water circuit is composed of a first cooling-water circuit and a second cooling-water circuit,
the cooling water passes through the engine when the cooling water is circulated in the first cooling-water circuit,
the cooling water bypasses the engine when the cooling water is circulated in the second cooling-water circuit, and
the warm-up device is provided in the first cooling-water circuit.

6. The engine warm-up apparatus according to claim 5, wherein
at least one of the following components is provided in the second cooling-water circuit,
(i) a throttle body for the engine,
(ii) an exhaust gas cooler for cooling down a part of exhaust gas to be re-circulated from an exhaust system to an intake system of the engine,
(iii) a heat exchanger for heating the cooling water by use of heat of the exhaust gas from the engine, and
(iv) a heater core for heating air to be supplied into a passenger compartment of the vehicle,
wherein a predetermined amount of the cooling water is circulated in the second cooling-water circuit when the cooling water is circulated through the heat accumulating device of the warm-up device.

7. The engine warm-up apparatus according to claim 1, wherein
the heat accumulating device has a heat insulating casing for accommodating therein the heat accumulating material and suppressing heat transfer between an inside and an outside of the heat insulating casing, and
the heat accumulating material is composed of:
(i) material which accumulates heat by a phase change from a solid state to a liquid phase; or
(ii) material which accumulates heat by electronic phase transition.

8. The engine warm-up apparatus according to claim 1, wherein
the heat accumulating material is composed of chemical heat accumulating material, which carries out heat accumulation and heat radiation in a reversible fashion by chemical reaction with water or ammonia, and
the heat accumulating device is composed of:
(i) a chemical heat accumulating casing;
(ii) a pipe connected to an inside of the chemical heat accumulating casing; and
(iii) a heat exchanger connected to the inside of the chemical heat accumulating casing via the pipe,
wherein the heat exchanger evaporates or condenses the water or ammonia, which is separated from the chemical heat accumulating material in the inside of the chemical heat accumulating casing.

9. The engine warm-up apparatus according to claim 1, wherein
the heat accumulating material is composed of such material, which carries out a phase change from a solid state to a liquid phase, and
the warm-up device controls a flow amount of the cooling water flowing into the engine depending on a volume change caused by the phase change of the heat accumulating material.

10. The engine warm-up apparatus according to claim 1, further comprising:
a water pump for circulating the cooling water through the cooling-water circuit, even when the operation of the engine is temporarily stopped.

11. The engine warm-up apparatus according to claim 1, wherein
the cooling water flowing into the warm-up device is circulated through the heat accumulating device and the accumulating-device bypassing passage when the temperature of the cooling water flowing into the warm-up device is higher than a predetermined temperature.

12. An engine warm-up apparatus for a vehicle comprising:
a cooling-water circuit for circulating cooling water through an engine of the vehicle;
a warm-up device arranged in the cooling-water circuit in such a way that the warm-up device works as a fluid resistance for a flow of the cooling water flowing into the engine, wherein the warm-up device operatively heats the cooling water during a start-up operation of the engine, wherein the warm-up device comprises:
(i) a heat accumulating device having heat accumulating material for carrying out heat exchange between the cooling water and the heat accumulating material in order that waste heat of the engine is accumulated in the heat accumulating material and/or heat accumulated in the heat accumulating material is radiated to the cooling water;
(ii) a passage switching device for switching a water passage for the cooling water flowing into the engine from a heat accumulating passage in which the cooling water flows through the heat accumulating device to an accumulating-device bypassing passage in which the cooling water bypasses the heat accumulating device; and
(iii) an electronic control unit for controlling the passage switching device in such a way that:
(iii-a) the cooling water is circulated only through the heat accumulating device when a temperature of the cooling water flowing into the warm-up device is lower than a first threshold value during the start-up operation of the engine so as to carry out a warm-up mode, wherein the first threshold value corresponds to a temperature indicating a first-stage completion of a warm-up operation of the engine;
(iii-b) the cooling water is circulated only through the accumulating-device bypassing passage when the engine is in its operation and when the temperature of the cooling water flowing into the warm-up device is higher than the first threshold value so as to carry out a cooling mode; and
(iii-c) the cooling water is circulated only through the heat accumulating device when the temperature of the cooling water flowing into the warm-up device is higher than a second threshold value during the operation of the engine is temporarily stopped so as to carry out a heat accumulating mode, wherein the second threshold value corresponds to a temperature indicating a second-stage completion of the warm-up operation of the engine and the second threshold value is higher than the first threshold value.

13. The engine warm-up apparatus according to claim 12, further comprising:
a radiator provided in the cooling-water circuit for cooling down the cooling water; and
a thermostat for circulating the cooling water through the radiator when the temperature of the cooling water flowing into the warm-up device is higher than a third threshold value,
wherein the third threshold value is higher than the second threshold value.

* * * * *